United States Patent [19]
Sakayori et al.

[11] Patent Number: 4,816,696
[45] Date of Patent: Mar. 28, 1989

[54] VARIABLE-SPEED PUMPED-STORAGE POWER GENERATING SYSTEM

[75] Inventors: Akihiro Sakayori, Hitachi; Takao Kuwabara, Hitachi; Akira Brando, Hitachi; Yasuteru Oono, Kobe; Shigeaki Hayashi, Suita; Isao Yokoyama, Himeji; Kenzyu Ogiwara, Hitachi, all of Japan

[73] Assignee: Hitachi, Ltd., Tokyo, Japan

[21] Appl. No.: 44,404

[22] Filed: Apr. 30, 1987

[30] Foreign Application Priority Data

Apr. 30, 1986 [JP] Japan .................. 61-99846
Apr. 30, 1986 [JP] Japan .................. 61-99849
Apr. 30, 1986 [JP] Japan .................. 61-99850

[51] Int. Cl.$^4$ .......................... H02K 7/18; H02P 9/04
[52] U.S. Cl. ........................ 290/52; 318/807; 322/14; 322/15
[58] Field of Search ............... 318/140, 807, 822, 821, 318/818; 290/52; 322/14–17, 29, 32, 38, 39; 417/53; 60/413, 414, 423, 464, 476, 398

[56] References Cited

U.S. PATENT DOCUMENTS

| | | | |
|---|---|---|---|
| 3,810,717 | 5/1974 | Rokcevic | 290/52 X |
| 4,287,429 | 9/1981 | Bashnin et al. | 290/40 C |
| 4,344,025 | 8/1982 | Okuyama et al. | 318/729 |
| 4,481,455 | 11/1984 | Sugimoto et al. | 318/778 |
| 4,625,125 | 11/1986 | Kuwabara | 322/14 X |
| 4,694,189 | 9/1987 | Haraguchi et al. | 290/52 X |
| 4,708,594 | 11/1987 | Shinmei et al. | 417/53 |
| 4,743,827 | 5/1988 | Shiozaki et al. | 318/798 |
| 4,754,156 | 6/1988 | Shiozaki et al. | 290/52 |

FOREIGN PATENT DOCUMENTS

| | | |
|---|---|---|
| 0141372 | 5/1985 | European Pat. Off. |
| 59-72998 | 4/1984 | Japan |
| 59-203883 | 11/1984 | Japan |

Primary Examiner—Bentsu Ro
Attorney, Agent, or Firm—Fay, Sharpe, Beall, Fagan, Minnich & McKee

[57] ABSTRACT

A variable-speed pumped-storage power generating system includes a variable-speed generator/motor, a frequency converter connected to an electric power system, and a pump/turbine driven by the generator/motor. The power generating system comprises an optimum rotation speed function generator calculating an optimum rotation speed of the motor for driving the pump, a speed detector generating a speed detection signal of the motor, a speed regulator receiving the output signals from the function generator and speed detector for generating an output correction signal, an adder adding the output correction signal to output command signal, a comparator comparing the output signal of the adder with an output power detection signal generated from a motor output detector and generating an error signal, and an output regulator controlling the excitation of the secondary winding of the motor through the frequency converter so as to decrease the output power error to zero, thereby controlling the output and rotation speed of the motor. The power generatign system also comprises an optimum guide-vane opening function generator calculating an optimum guide vane opening, a comparator comparing the output signal of the guide-vane opening function generator with a guide-vane opening detection signal from a guide-vane opening detector, and a guide-vane opening regulator controlling the opening of the guide vanes according to the result of the comparison.

4 Claims, 10 Drawing Sheets

VARIABLE-SPEED PUMPED-STORAGE POWER GENERATING SYSTEM

BACKGROUND OF THE INVENTION

This invention relates to a variable-speed pumped-storage power station, and more particularly to a variable-speed pumped-storage power generating system which is suitable to stably continue pumping operation under command of an output command signal.

A variable-speed pumped-storage power generating system is commonly known from the disclosure of, for example, U.S. Pat. No. 4,481,455. The disclosed system includes a generator motor which has a primary winding connected to an a.c. power system through a main circuit including a breaker and a main transformer. The generator motor is directly coupled at its rotor to a prime mover/load and has a secondary winding connected to the a.c. power system through an excitation circuit including a frequency converter and an exciting transformer. The system disclosed in the cited patent has such a great advantage that the prime mover/load can be driven at a rotation speed independent of the frequency of the a.c. power system. In an application of the power generating system to a variable-speed pumped-storage power station, a turbine/pump is coupled directly to the rotor of the generator motor as the prime mover/load, and, during generating operation, the rotor of the generator motor (the generator) is driven by the water turbine, thereby inducing power in the primary winding of the generator motor. The induced power is supplied to an electric power system. On the other hand, during motoring operation (pumping operation), the generator motor is driven as the motor by the power supplied from the electric power system, and water is pumped up by the pump coupled directly to the rotor of the generator motor. In this case, the frequency of the electric power system is constant or, for example, 60 Hz. However, the rotation speed of the turbine/pump can be freely selected independently of the frequency of the electric power system. Thus, the rotation speed is selected to maximize the operation efficiency of the water turbine or pump.

The fact that the rotation speed N of the turbine/pump can be freely selected means that there is a slip frequency $f_2$ between the frequency $f_1$ of the electric power system and the frequency $f(=(P \times N)/120$, P: the number of poles of winding) corresponding to the rotation speed N of the turbine/pump, and the following equation (1) holds:

$$f_2 = f_1 - f = f_1 - (P \times N)/120 \qquad (1)$$

The slip frequency $f_2$ in the equation (1) is the frequency of the secondary winding of the generator motor, and the rotation speed N can be set at a value which maximizes the pump efficiency or turbine efficiency while maintaining constant the frequency $f_1$ of the electric power system. There are two principal manipulated variables that can be regulated to satisfy the equation (1). One of them is the opening of inlet valves or guide vanes in a conduit leading to the turbine/pump, and the other is the firing angle of thyristors constituting the frequency converter. These variables are suitably controlled according to a power command signal given to the variable-speed pumped-storage power station.

U.S. Pat. No. 4,481,455 cited above does not refer to a manner of concrete control of such a variable-speed pumped-storage power station. In this connection, a patent application, for example, JP-A-60-90991 (corresponding to U.S. Pat. No. 4,625,125) discloses a control apparatus suitable for controlling such a poswer station although its principal intention is control of the power station during generating operation. According to the disclosure of the known patent application, an output command signal and a turbine's head signal are applied as inputs to function generators which generate an optimum speed command signal and an optimum guide vane opening command signal respectively. A signal representing the actual rotation speed of the water turbine corresponding to the former command signal is fed back to control the firing angle of the thyristors of the frequency converter, and a signal representing the actual opening of the turbine's guide vanes corresponding to the latter command signal is fed back to control the opening of the guide vanes of the water turbine. Further, a frequency variation or power variation in the electric power system is detected to correct the output command signal thereby consequently correcting the opening of the guide vanes. The disclosed control apparatus is intended exclusively for controlling the generating operation of the power station, and the output command signal applied as an input is used merely as an auxiliary signal for obtaining a target speed signal and a target guide-vane opening signal. That is, the output command signal is not directly compared with an actual generator output. Thus, from the viewpoint of output control (of the generator), open loop control systems are provided for the speed control and guide-vane opening control, and the generator output is determined as a result of the above controls. From the viewpoint of the generator output control, such open loop control systems, in which the rotation speed control is a primary object, and the generator output control is a secondary object, do not quickly respond but respond with a delay time. Further, although plural control systems such as the rotation speed control and the generator output control are desired sometimes to be applied to the same generator any practical counter-measure against interference therebetween has not been realized yet. In the nighttime when the load of the electric power system is light, most thermal power plants are stopped and a greater part of the load is supplied from nuclear power stations which must make base load operation, hence, which do not have a frequency regulatability, and the remaining part is borne by hydroelectric power stations and other thermal power stations operable with a low generation cost. That is, for the purpose of an economical use of the electric power system, the thermal power stations requiring a high generation cost are shut down in the nighttime. Thus, shortage of the electrical output and unsatisfactory frequency regulation may occur in the nighttime. That is, the function of regulating the quantity of supplied power according to a load variation and accordingly the function of maintaining the frquency of the power system substantially constant are not fully exhibited.

A pumped-storage power station of variable-speed type provides various merits. One of the merits is that the power station can operate at a high efficiency in each of the generating operation mode and the pumping operation mode. According to another merit, the function of controlling the frequency of the electric power system can be effected even when the power station operates in the pumping mode, that is, when the generator motor operates as the motor. These are most desirable merits in use of the pumped-storage power station of the variable-speed type.

However, the known control system, which is based only on the prmise that the rotation speed is controlled by controlling the output of the motor, is not satisfactory in frequency control of the electric power system when operated in the pumping mode, especially, in terms of response time and compatibility of its power control and speed control.

SUMMARY OF THE INVENTION

With a view to obviate the prior art inability of fully exhibiting the AFC function, it is a primary object of the present invention to provide a variable-speed pumped-storage power generating system suitable for fully exhibiting the AFC function during pumping operation and executing both the drive output control and the rotation speed control for the motor independently of each other and without contradiction.

In accordance with one aspect of the present invention, there is provided a variable-speed pumped-storage power generating system including a generator motor having a primary winding connected to an electric power system and a secondary winding connected to the electric power system through a frequency converter, and a turbine/pump directly coupled to the shaft of the generator motor, the variable speed pump or pump-generating system comprising means for producing a target power signal by adding an error signal representing the difference between an actual rotation speed and a target rotation speed of the generator motor to an output command signal commanding an output power required for the variable speed pump or pump-generating system, and controlling an internal phase difference angle (a phase difference between an internal induced voltage and a terminal voltage) through the frequency converter according to an error signal between the target power signal and a power feedback signal feeding back an actual output power of the generator-motor, the output command signal including also a command signal from an AFC device installed in a central load-dispatching office generally controlling the electric power and pump system or such control signal for the electric power system.

DESCRIPTION OF THE PREFERRED EMBODIMENTS

Figure 1:
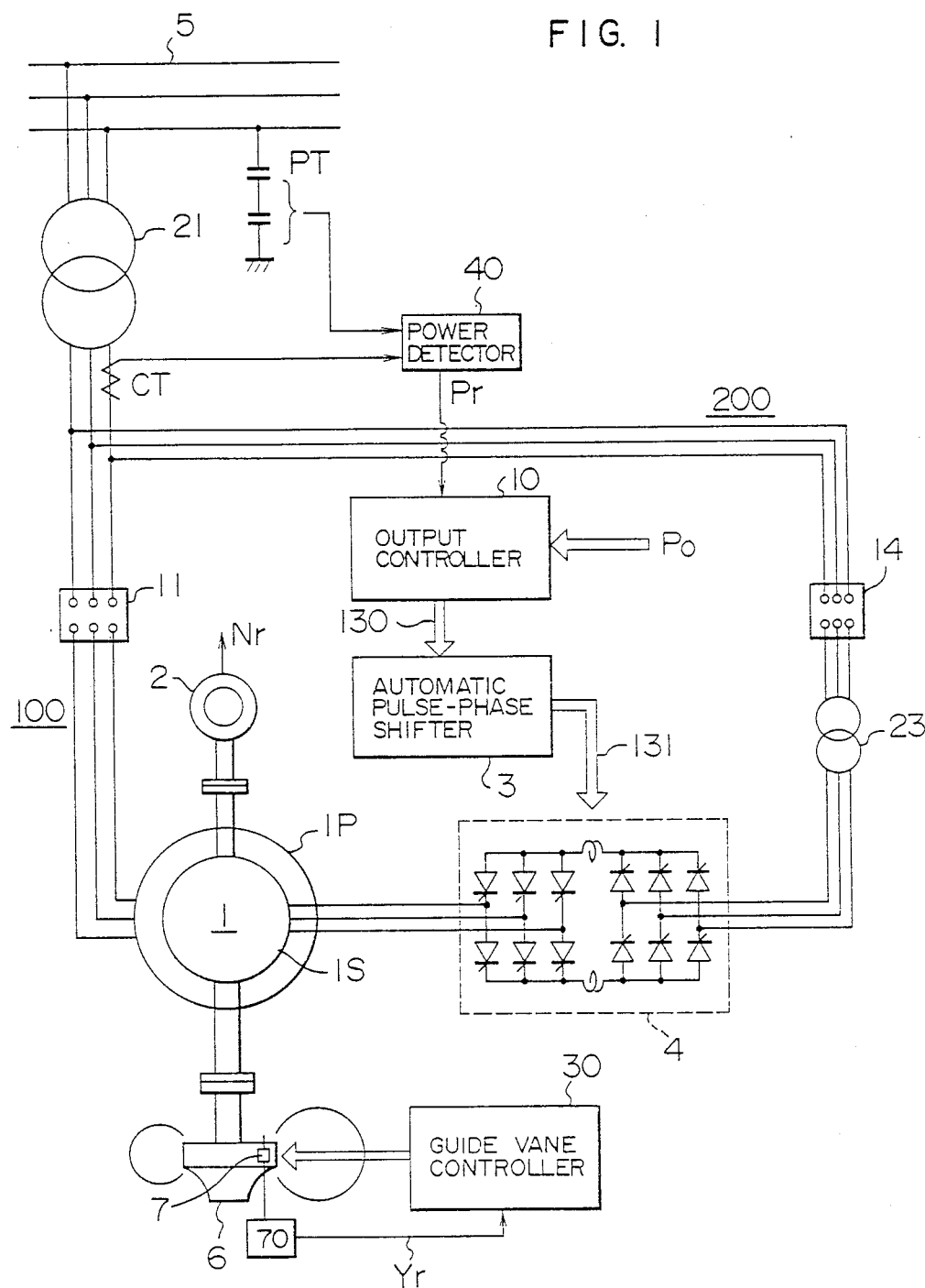
FIG. 1 shows diagrammatically the structure of a variable-speed pumped-storage power generating system to which the present invention is applied.

FIG. 1 shows diagrammatically the structure of a variable-speed pumped-storage power generating system to which the present invention is applied.

Referring to FIG. 1, a generator motor 1 directly coupled to a turbine/pump 6 has a primary winding 1P and a secondary winding 1S. The primary winding 1P is connected to an electric power system 5 through a main circuit 100 including a breaker 11 and a main transformer 21. The secondary winding 1S is connected to the electric power system 5 through an excitation circuit 200 including a frequency converter 4, an exciting transformer 23 and a breaker 14. An output controller 10 generates a control voltage signal 130 on the basis of an output command signal $P_o$ applied thereto and applies the signal 130 to an automatic pulse-phase shift controller 3. On the basis of the signal 130, the automatic pulse-phase shift controller 3 generates and applies a firing signal 131 to thyristors constituting the rquency converter 4. A guide vane controller 30 is provided to control the opening of guide vanes 7 of the water turbine 6. In order to detect various plant variables in the variable-speed pumped-storage power generating system, there are a detector 40 detecting the electric power $P_r$, another detector 2 detecting the rotation speed $N_r$ of the turbine/pump 6, another detector 70 detecting the opening $Y_r$ of the guide vanes 7, and another detector (not shown) detecting the gross head $H_{ST}$ of the turbine/pump 6. A potential transformer PT and a current transformer CT are connected to the power detector 40.

Figure 2:
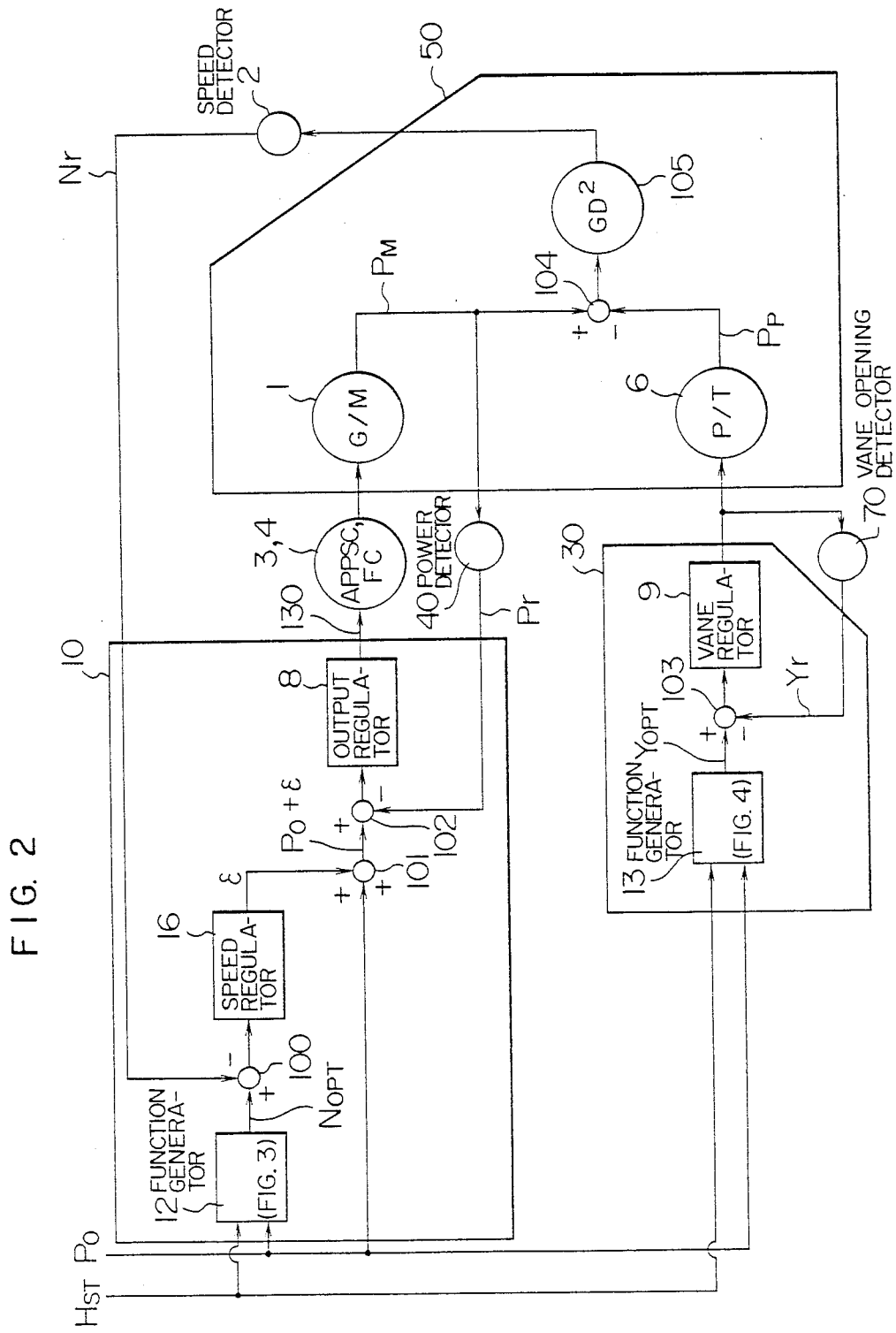
FIG. 2 is a block diagram showing the structure of a typical embodiment of the present invention.

A typical embodiment of the present invention will now be described with reference to FIG. 2. Referring to FIG. 2, the output controller 10 receives as inputs an output command signal $P_o$ from a central load-dispatching office and/or a local setter, a gross head detection signal $H_{ST}$ from the head detector (not shown), a pump rotation speed signal $N_r$ from the pump speed detector 2, and a load detection signal $P_r$ from the power detector 40, and applies a control voltage signal 130 to the APPSC (Automatic Pulse Phase Shift) 3 as an output. An opening detection signal $Y_r$ from the guide-vane opening detector 70 is applied as an input to the guide-vane opening controller 30 in addition to the signals $P_o$ and $H_{ST}$. On the basis of these input signals, the controller 30 determines the opening of the guide vanes of the turbine/pump 6. A guide vane regulator 9 is a sort of a hydraulic amplifier and normally makes an integrating operation. As far as there is a difference between the signals $Y_{OPT}$ and $Y_r$, the guide vane regulator 9 integrates the difference between $Y_{OPT}$ and $Y_r$ negatively fed back from the vane opening detector 70 until $Y_r$ becomes equal to $Y_{OPT}$. The generator-motor 1 and the turbine/pump 6 constitute a rotary mechanical system 50 together with an adder part 104 and an inertia effect part 105. It will be seen that the rotation speed $N_r$ of the turbine/pump 6 is determined by the difference between the input and output torques of the rotary mechanical system 50.

The present invention shown in FIG. 2 is featured in that the power control system is constructed so that the actual drive power can directly follow up the output command signal $P_o$ and is formed as part of the secondary excitation control system of the generator motor 1. Further, the present invention is featured in that a signal $\epsilon$ for controlling the rotation speed of the generator motor 1 is added to the output command signal $P_o$ as a correction signal. In FIG. 2, the output command signal $P_o$ is applied to the output controller 10 from, for example, the central load-dispatching office and includes an AFC signal besides an ELD (economical load dispatch) signal etc. The output controller 10 responds quickly to the output command signal $P_o$ including the AFC signal which change incessantly. Another input to the output controller 10 is the signal indicative of the gross head $H_{ST}$. This gross head $H_{ST}$ simply represents the water level difference between an upper reservoir and a lower reservoir for the turbine/pump 6. On the other hand, the net pump head H is defined as the sum of the gross head $H_{ST}$ and a conduit loss in the pumping system. Thus, when the condition of location of the pumping system is such that there is little variation in the water level (variation in the gross head $H_{ST}$) during operation of the turbine/pump 6, the gross head $H_{ST}$ need not be detected by the $H_{ST}$ detector (not shown) and can be handled as a constant value. In such a case, it is apparent that function generators 12 and 13 described below are only required to respond to the output command signal $P_o$ and may be made simpler in structure.

The output controller 10 includes an optimum rotation speed function generator 12 calculating an optimum rotation speed $N_{OPT}$ of the turbine/pump 6 from the signals $P_o$ and $H_{ST}$, a comparator 100 comparing the optimum rotation speed $N_{OPT}$ provided by the output signal from the function generator 12 with an actual rotation speed $N_r$ detected by the speed detector 2, and a speed regulator 16 including at least an integrating element for decreasing the speed error to zero. The circuits described above constitute a speed control system, and an output correction signal $\epsilon$ appears from the speed regulator 16.

The output correction signal $\epsilon$ is added to the output command signal $P_o$ in an adder 101 to provide a composite output command signal $(P_o+\epsilon)$, and this composite signal $(P_o+\epsilon)$ is compared with an actual drive output $P_r$ detected by a detector 40 in a comparator 102. An output regulator 8 including at least an integrating element is connected to the comparator 102 so as to provide a negative feedback circuit to decrease the error between $P_r$ and $(P_o+\epsilon)$ to zero. The circuits described above constitute an output control system. The output signal of the output regulator 8 provides the control voltage signal 130 applied to the APPSC 3 to determine an internal phase difference angle through the thyristors of the frequency converter 4 thereby controlling the drive output $P_M$ of the motor 1. This drive output $P_M$ is detected by the power detector 40 as $P_r$ which is used for the negative feedback control of the output.

As in the case of the output controller 10, the output command signal $P_o$ and the gross head signal $H_{ST}$ are applied to the guide-vane opening controller 30. The guide-vane opening controller 30 includes an optimum guide-vane opening function generator 13 calculating an optimum guide-vane opening $Y_{OPT}$ from the output command signal $P_o$ and gross head signal $H_{ST}$, a comparator 103 comparing the optimum guide-vane opening $Y_{OPT}$ provided by the output signal from the function generator 13 with an actual guide-vane opening $Y_r$ detected by the guide-vane opening detector 70, and a guide vane regulator 9 including at least an integrating element for decreasing the error between $Y_{OPT}$ and $Y_r$ to zero. By the above manner of control, a mechanical input $P_p$ required for the turbine/pump 6 is determined. When the actual drive output $P_M$ of the motor 1 does not coincide with the mechanical input $P_p$ required for the turbine/pump 6 in the rotary mechanical system 50, the difference or error $(P_M-P_p)$ results in a speed change appears through the inertia effect part $GD^2$ 105. As a result, the speed $N_r$ of the motor 1 is detected by the speed detector 2, and the drive output $P_M$ of the motor 1 is controlled until the speed signal $N_r$ becomes equal to its target speed signal $N_{OPT}$.

Figure 3:
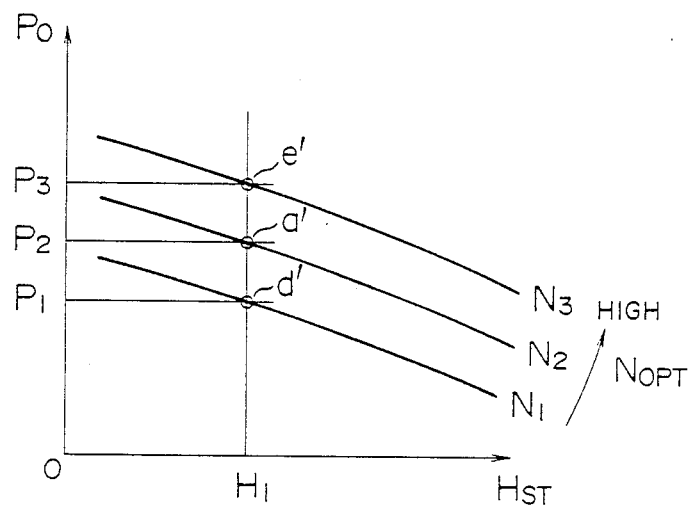
FIGS. 3 and 4 are graphs showing the characteristics of the function generators 12 and 13 shown in FIG. 2 respectively.
Figure 4:
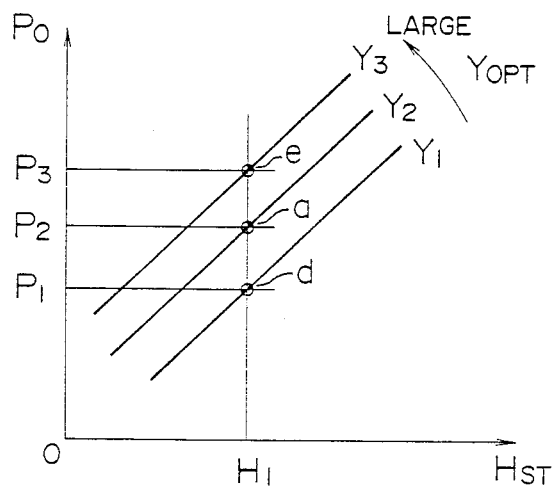

FIGS. 3 and 4 show the characteristics of the function generators 12 and 13 respectively. In these graphs, the values of $N_{OPT}$ and $Y_{OPT}$ required to optimize the efficiency of the turbine/pump are determined as a function of $H_{ST}$ and $P_o$ as a result of a model test on the turbine/pump. It can be understood from FIG. 3 that the larger the value of $P_o$, the value of $N_{OPT}$ is larger when $H_{ST}$ is constant, and the larger the value of $H_{ST}$, the larger is the value of $N_{OPT}$ when $P_o$ is constant. Also, it can be understood from FIG. 4 that the larger the value of $P_o$, the larger is the value of $Y_{OPT}$ when $H_{ST}$ is constant, and the larger the value of $H_{ST}$, the smaller is the value of $Y_{OPT}$ when $P_o$ is constant. Therefore, when the output command signal $P_o$ increases within a short period of time in which any appreciable variation does not occur in the gross head $H_{ST}$, such an increse in $P_o$ can be sufficiently dealt with by increasing both of $N_{OPT}$ and $Y_{OPT}$. Similarly, a decrease in $P_o$ can be sufficiently dealt with by decreasing both of $N_{OPT}$ and $Y_{OPT}$. This means that the manner of control is to be such that a change in $P_o$ is dealt with by changing both of $P_M$ and $P_p$ in the same direction. That is, $P_p$ is increased when $P_M$ is increased. Also, an increase in $H_{ST}$ when $P_o$ is constant is dealt with by decreasing $Y_{OPT}$ and increasing $N_{OPT}$.

Figure 5:
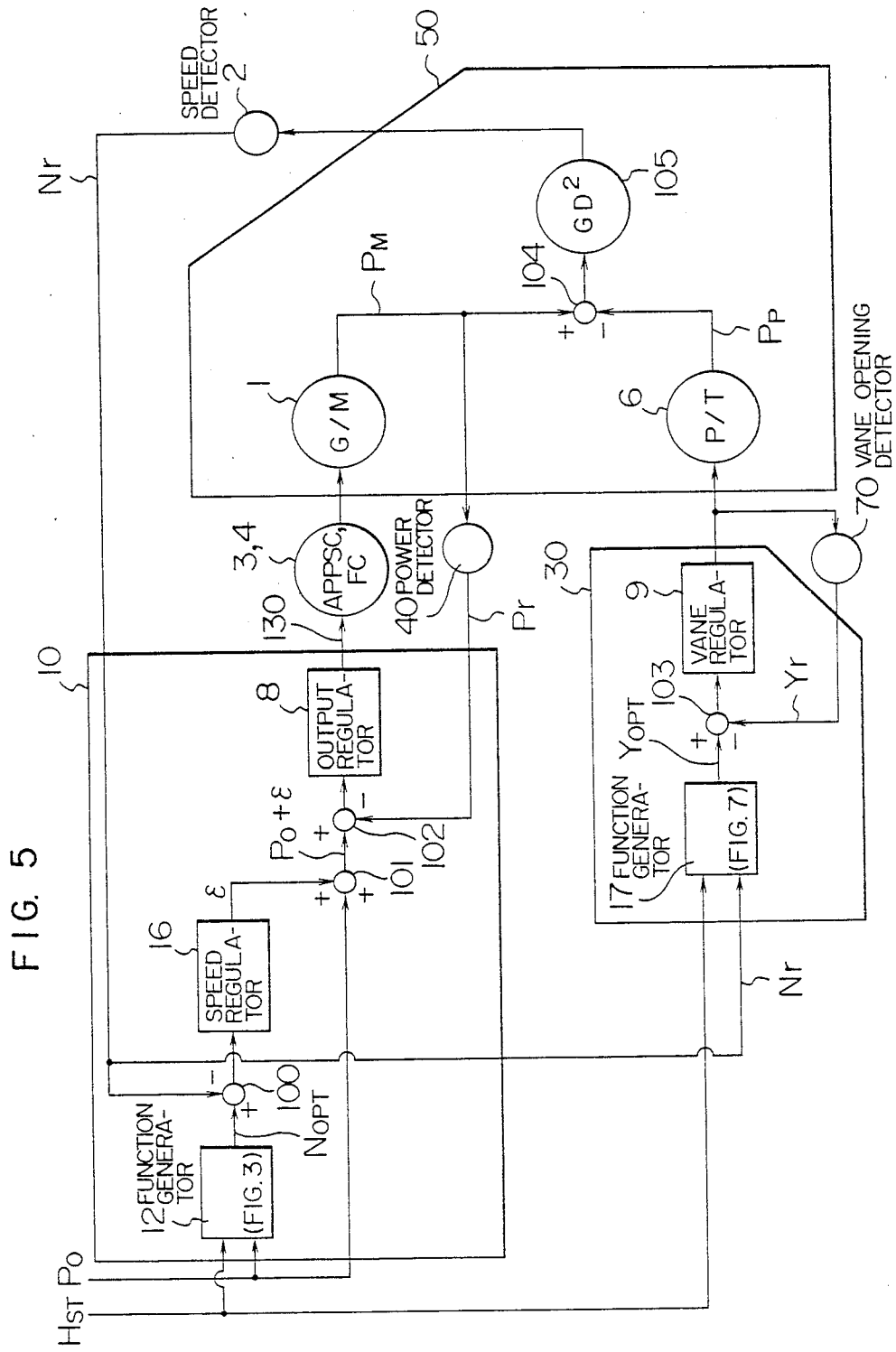
FIGS. 5 and 6 are block diagrams of modifications showing other manners of calculating the optimum opening of the guide vanes.
Figure 6:
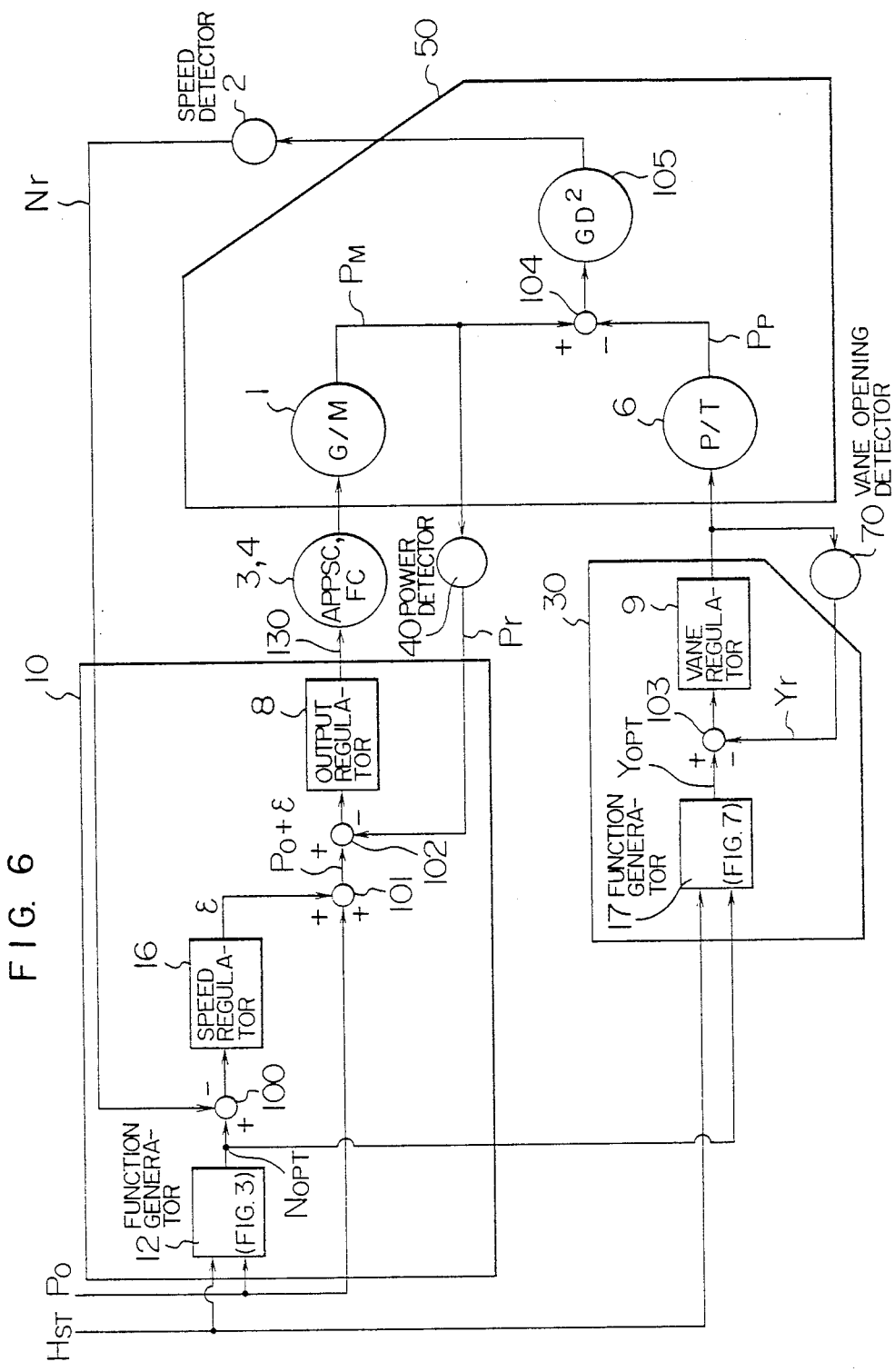

FIGS. 5 and 6 show modifications of the block diagram shown in FIG. 2. In each of modifications shown in FIGS. 5 and 6, the manner of signal processing, in the output controller 10 remains unchanged, and the manner of calculation of the optimum guide-vane opening $Y_{OPT}$ in the guide-vane opening controller 30 differs from that of FIG. 2. In FIG. 2, the optimum guide-vane opening $Y_{OPT}$ is calculated on the basis of the gross head signal $H_{ST}$ and output command signal $P_o$. In contrast, in FIGS. 5 and 6, the optimum guide-vane opening $Y_{OPT}$ is calculated on the basis of the gross head signal $H_{ST}$ and the speed command signal or an actual speed. That is, in FIG. 5, the detected speed $N_r$ is used for calculation of $Y_{OPT}$, while in FIG. 6, the output $N_{OPT}$ of the function generator 12 is used for the calculation of $Y_{OPT}$. In each case, a function generator 17 having combined characteristics of FIGS. 3 and 4 is used for the calculation of $Y_{OPT}$. It is apparent that, in this case too, changing directions of the drive output $P_M$ and the mechanical input $P_p$ due to a change in $P_o$ or $H_{ST}$ are similar to those described with reference to FIG. 2.

The embodiments shown in FIGS. 5 and 6 differ only from that shown in FIG. 2 in the manner of calculation of the optimum guide-vane opening $Y_{OPT}$, and they are identical to the invention disclosed in FIG. 2 in the technical idea of the present invention in which a correction is applied to the generator motor drive output control system from the rotation speed control system. Further, as described already, the response of the output control system is very quick as compared to that of the guide-vane opening control system. The object of the present invention (which contemplates to provide a variable-speed pumped-storage power generating system suitable for full exhibition of the AFC function especially during pumping operation) will be described by reference to the typical embodiment of the present invention shown in FIG. 2.

Suppose, for example, that an oversupply of electric power occurs in the electric power system including the variable-speed pumped-storage power stations, and an increase in the power system frequency results. In such an event, the central load-dispatching office applies an output-decrementing command signal to the power stations and applied also a drive power (electrical load)-incrementing command signal $P_o$ to the variable-speed pumped-storage power station of the present invention operating in its pumping mode. In response to this drive output-incrementing command signal $P_o$, the variable-speed pumped-storage power generating system shown in FIGS. 1 and 2 operates as described below. It is supposed herein that the plant variables $N_r$, $P_r$ and $Y_r$ at various parts in FIG. 2 are set at $N_r = N_{OPT}$ by the speed control system, $P_M = P_r = P_o$ and $\epsilon = 0$ by the output control system, and $Y_r = Y_{OPT}$ by the guide vane control system, before the output command signal $P_o$ is incremented from its constant value. There holds the relation $P_M = P_p$ between the mechanical input $P_p$ required for the turbine/pump 6 and the actual drive output $P_M$ of the motor 1. This is because the difference $(P_M - P_p)$ becomes zero due to the inertia effect $GD^2$ (105) of the combination of the motor 1 and the turbine/pump 6, which can be regarded as a kind of an integrating element. Therefore, when errors that may occur in the function generators 12 and 13 are ignored, $Y_{OPT}$ and $N_{OPT}$ take a value corresponding to $P_o$, or the relations $Y_{OPT} = $ a value corresponding to $P_o$ and $N_{OPT} = $ a value corresponding to $P_o$ hold. Thus, the relation $P_o = Y_{OPT}$ corresponding value $= Y$ corresponding value $= P_p = P_m$ holds, and the output correction signal $\epsilon$ is zero.

When, under such a state, the drive output command signal $P_o$ from the central load-dispatching office shows a sharp increase at time $t_1$ as shown in FIG. 7(a), the actual drive output $P_M$ increases relatively quickly as described later, and, on the other hand, the rotation speed command signal $N_{OPT}$ generated from the function generator 12 increases almost instantaneously, as will be apparent from FIG. 3 showing the characteristic of the function generator 12. On the other hand, the actual rotation-speed detection signal $N_r$ cannot immediately increase up to the level of the signal $N_{OPT}$ due to the inertia effect or the like as described later, and an error occurs therebetween. This error is integrated by the integrating function included in the speed regulator 16 to appear as the correction signal $\epsilon$. This correction signal $\epsilon$ is added to the drive output command signal $P_o$ in the adder 101 to provide the composite drive output command signal $(P_o + \epsilon)$ for the generator motor 1. This command signal $(P_o + \epsilon)$ is compared with the actual output detection signal $P_r$ in the comparator 102, and the resultant signal is applied to the output regulator 8. This output regulator 8 calculates an excitation voltage V to be applied to the secondary winding 1S of the generator motor 1 so as to develop the drive output demanded by the composite drive output command signal $(P_o + \epsilon)$. Especially, among functions for determining the quantities of excitation of the individual phases of the secondary winding 1S of the generator motor 1, thereby controlling the internal phase difference angle $\Delta\delta$, a-phase, b-phase and c-phase voltages Va, Vb and Vc of the secondary winding 1S of the generator motor 1 are given as follows:

$$
\begin{aligned}
Va &= E \sin(2\pi f_s t + \delta_o + \Delta\delta) \\
Vb &= E \sin(2\pi f_s t + \delta_o + \Delta\delta - 120°) \\
Vc &= E \sin(2\pi f_s t + \delta_o + \Delta\delta - 240°)
\end{aligned}
\quad (2)
$$

where E is a voltage value determined by slip S and operating conditions of the variable-speed generator motor, $\delta_o$ is the internal phase difference angle determined by the operating conditions of the variable-speed generator motor, and $\Delta\delta$ is the internal phase difference angle controlled by the output signal of the output controller 8.

In the control of the variable-speed generator motor according to the equation (2), the voltage E is to be controlled according to the reactive power control command, and the internal phase difference angle $\Delta\delta$ is to be controlled according to the effective power control command. Thus, effective power is used as information for controlling the internal phase difference angle $\Delta\delta$ of the secondary winding 1S of the generator motor 1. That is, the internal phase difference angle $\Delta\delta$ is expressed as follows:

$$\Delta\delta = \int k_1(P_r - P_o - \epsilon)dt + k_2(P_r - P_o - \epsilon) \quad (3)$$

where $k_1$, $k_2$ are constants. Calculation of the equation (3) in the output regulator 8 is so-called proportional plus integral calculation.

The signal representing the internal phase difference angle $\Delta\delta$ thus calculated is applied from the output controller 10 to the APPSC 3. In the APPSC 3, the firing of the thyristors of the frequency converter 4 is controlled to control the exciting voltage V applied to the secondary winding 1S of the generator motor 1, so that a rotating magnetic field corresponding to the slip frequency $f_2$ can be applied to the rotor, and the value of the exciting voltage V meets the actual internal phase difference angle $\Delta\delta$. By the above manner of control, the drive output $P_M (= P_r)$ of the generator motor 1 follows up the composite drive output command signal $(P_o + \epsilon)$ as shown in FIG. 7(d). This output control system constituted by the electrical circuits has a delay time determined substantially by, for example, the integrating function of the output regulator 8. This delay time is quite short as compared to a delay in the response of the rotation speed and the guide vane opening, and the drive output $P_M$ follows up the signal $(P_o + \epsilon)$ without any appreciable delay.

On the other hand, the guide-vane opening command signal $Y_{OPT}$ generated from the function generator 13 responding to the incremented output command signal $P_o$ is increased as shown in FIG. 7(c). $Y_r$ delays slightly relative to the change of $P_o$ due to the effect of a delay inherent in the $Y_{OPT}$ circuit or due to the presence of a delay element purposefully provided. Because of a speed limitation determined by the guide-vane regulator 9 or due to a delayed operation of the hydraulic amplifier in the regulator 9, the response of the actual guide-vane opening $Y_r$ is slow as seen in FIG. 7(c). Therefore, the mechanical input $P_p$ changes at a rate slow relative to a change in the drive output $P_M$. Because of the above relation between the mechanical input $P_p$ and the drive output $P_M$, the turbine/pump 6 is accelerated according to the difference between the drive output $P_M$ and the mechanical input $P_p$ as shown in the block 50 in FIG. 2, and the rotation speed $N_r$ of the turbine/pump 6 increases. With the increase in the speed $N_r$, the error between $N_r$ and $N_{OPT}$ decreases until finally the relation $N_{OPT}=N_r$ is attained. Also, because the relation $Y_{OPT}=Y_r$ is satisfied by the guide vane regulator 9, the operation of the turbine/pump 6 is stabilized.

The reason why $\epsilon=0$ is achieved under a steady state, that is, how $P_o=P_r$ is achieved in a steady state will now be described. As described above, the mechanical input $P_p$ corresponds to the actual guide-vane opening $Y_r$. As also described above, the relation $Y_{OPT}=Y_r$ holds.

Further, according to the operating principle of the optimum guide-vane opening function generator 13, the relation $Y_{OPT}=P_o$ corresponding value holds.

On the other hand, the combination of the output regulator 8 (including the integrating element) and the $P_r$ negtive feedback circuit provides the relation $P_o+\epsilon=P_r$. Further, as described already, the relation $P_r=P_M$ holds. Also, considering the integrating action of the inertia effect part 105 and the action of the $N_r$ negative feedback circuit, the relation $P_M=P_p$ holds.

From the above, it can be concluded that the relation $P_o+\epsilon=P_r=P_M=P_p=Y_r$ corresponding value$=Y_{OPT}$ correspnding value$=P_o$ holds, and the value of $\epsilon$ becomes finally zero.

Figure 7:
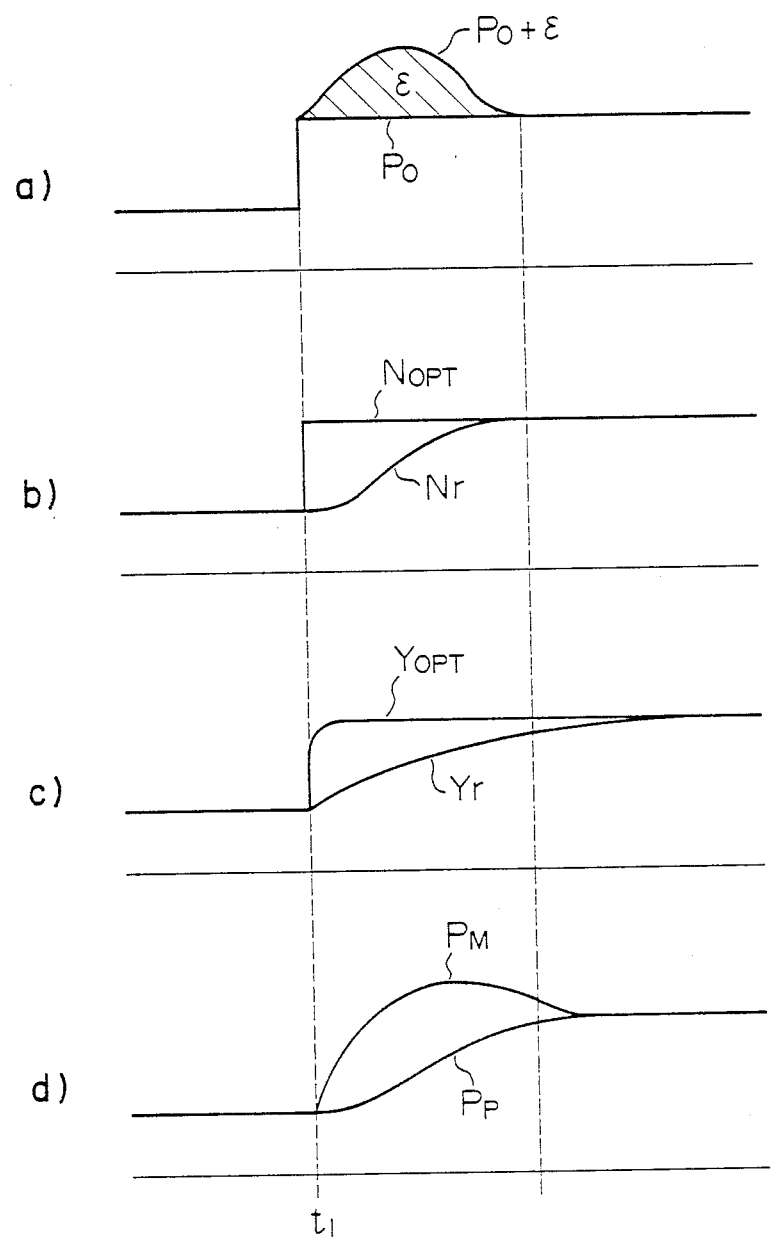
FIGS. 7 and 8 show how various status quantities in FIG. 2 change when the output command signal $P_o$ is changed.
Figure 8:
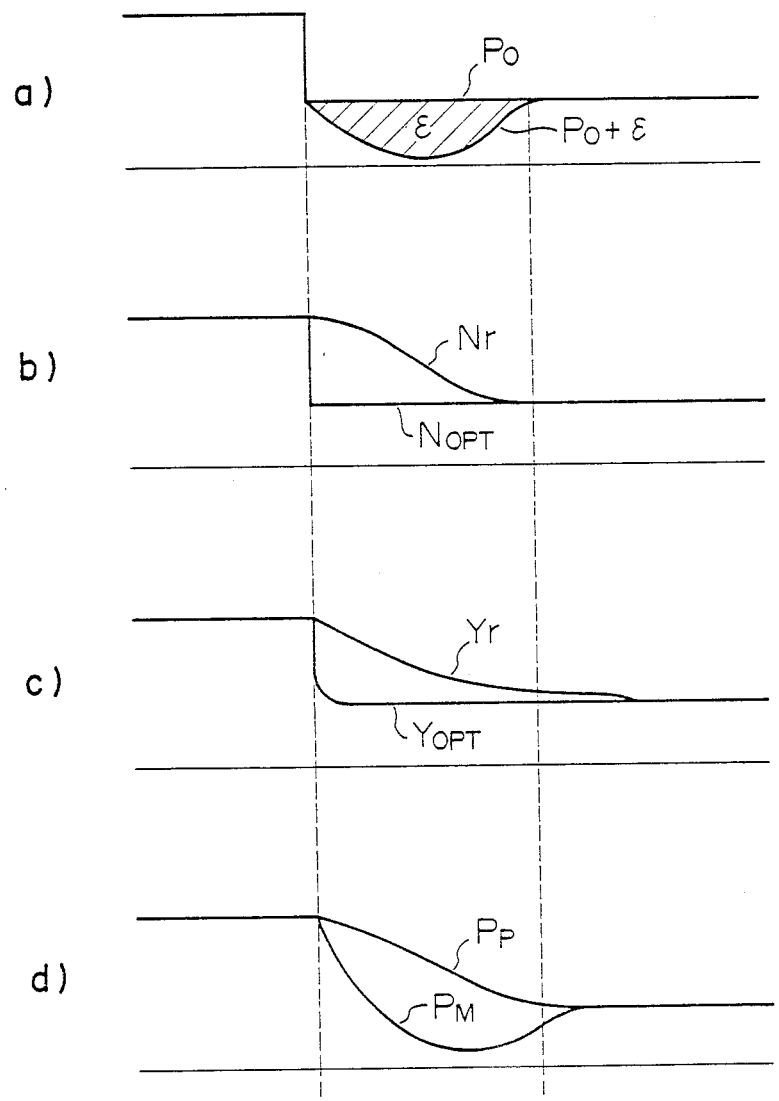

Thus, in spite of the application of both the drive output control and the rotation speed control to the same motor 1, both of these controls can be reliably executed without any contradiction therebetween. In FIG. 7, the drive output control is principal, while the rotation speed control is a supplemental corrective control, and the response of the drive output $P_M$ of the generator motor 1 can sufficiently follow up the command within several seconds. Thus, the variable-speed pumped-storage power generating system of the present invention can simply follow up the frequency control signal for the electric, power system. FIG. 8 shows response characteristics when the ouput command signal $P_o$ commands a decreased output, but its description is unnecessary since it can be sufficiently understood from FIG. 7.

Figure 9:
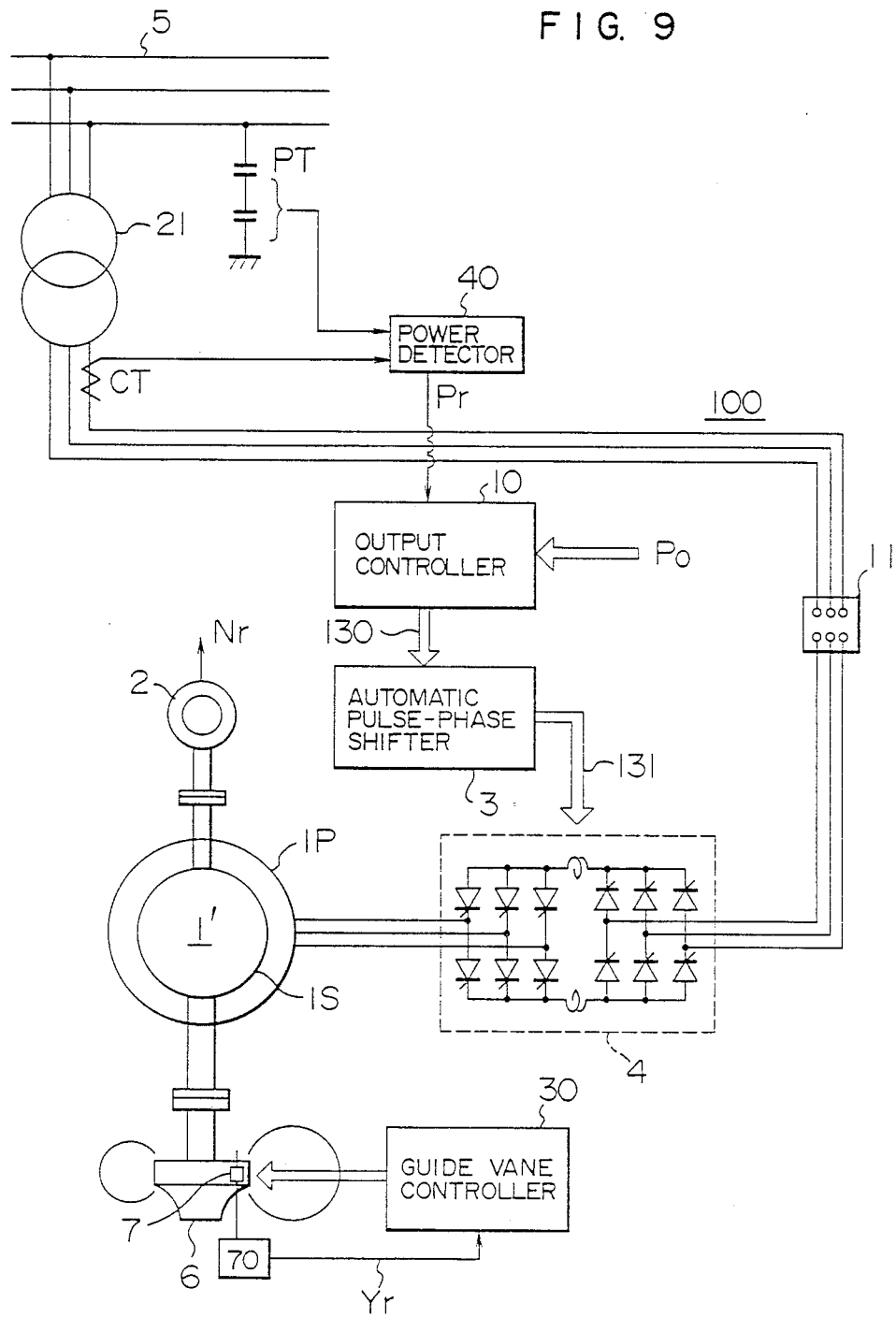
FIG. 9 shows diagrammatically the structure of another variable-speed pumped-storage power generating system to which the present invention is also applicable.

The present invention has been described by reference to its application to a variable-speed pumped-storage power generating system of secondary excitation type as shown in FIG. 1. The present invention is also applicable to a pumped-storage power generating system of a type as shown in FIG. 9 in which a synchronous generator motor 1' driving a turbine/pump 6 is connected at its primary winding 1P to an electric poswer system 5 through a frequency converter 4. Although, in this case, the frequency of the primary winding 1P and the rotation speed of the turbine/pump 6 are proportional to each other, the rotation speed of the generator motor 1' can be made variable by controlling the frequency of voltage supplied to the primary winding 1P independently of the frequency of voltage in the electric power system 5. Also, the drive output of the generator motor 1' can be made variable by regulating the quantity of power supplied to the primary winding 1P.

The above description has referred to the operation after the pumping operation has been normally started. Consider now the stage where the guide vanes start to be opened prior to the pumping operation. This pumping starting stage includes depression of the water level, rotation of the pump/turbine under a no-loaded condition, release of the water-level depressing pressure to permit rise of the water level, opening tbhe guide vanes, and starting the pumping operation. In this stage, the rate of increase in the pump input, after the guide valves are opened, is generally sharp immediately after the guide valves start to be opened. Unless this abrupt change in the pump input is appropriately dealt with, the rotation speed of the generator motor decreases greatly or deviates from the allowable band of the variable speed. On the other hand, when the frequency converter is designed so that the excitation control can deal with such an abrupt change in the pump input occurring in the stage of starting the pumping mode, the current and other ratings of the drive motor, frequency converter, etc. must be increased, resulting in an uneconomical design.

Figure 10:
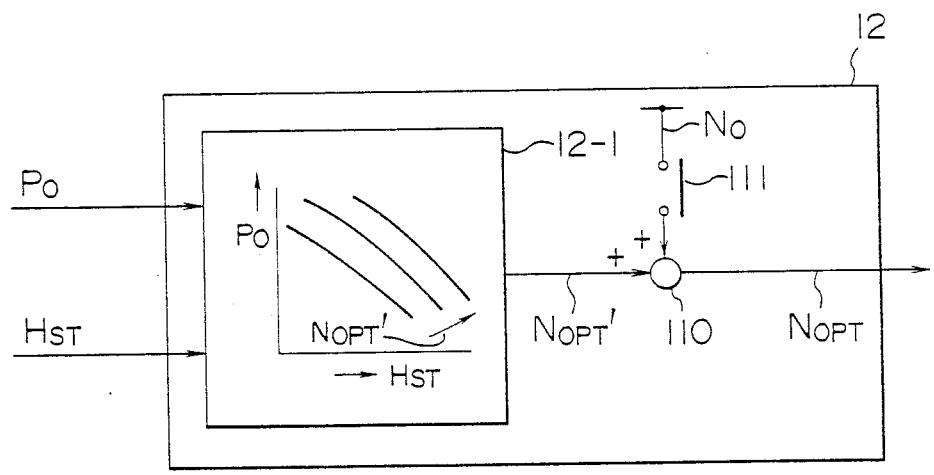
FIG. 10 shows one form of a function generator suitable for starting the pumping operation.

FIG. 10 shows a modification of the function generator 12 which overcomes such a problem. Referring to FIG. 10, a bias $N_0$ is applied through a contact 111, which is closed in the pumping operation starting stage (that is, before and immediately after the guide vanes are opened), to an adder 110 to be added to an optimum rotation speed signal $N_{OPT}'$ generated from a function generator 12-1. Thus, at the beginning of the pumping operation starting stage, the turbine/pump 6 is driven at the speed $N_{OPT}=N_{OPT}'+N_0$, and, even when the rotation speed decreases temporarily due to the opening of the guide vanes, the rotation speed of the pump can be maintained at a value close to the optimum speed $N_{OPT}'$. In this connection, continuous application of the bias $N_0$ to the adder 110 is not desirable, and application of the bias $N_0$ should be suitably stopped when the operation seems to be stablized after the guide vanes are opened.

The variable-speed generator motor 1 shown in FIG. 1 is of the type which has a primary winding and a secondary winding, which is connected at its primary winding to an electric power system, and whose secondary winding is a.c. excited by a frequency converter so that its rotor is rotated at a speed different from its synchronous speed. In the generator motor of such a type, a problem as described below arises when it is driven at a speed close to its synchronous speed. That is, the frequency converter exciting the secondary winding of the variable-speed generator motor is composed of anti-parallel connected thyristors. In this frequency converter, current is concentrated in specific thyristors for a long period of time when the generator motor is driven at the speed close to the synchronous speed, and, owing to the resultant rise of heat, the current capacity of the frequency converter greatly decreases.

The rotation speed range in which such a decrease in the current capacity of the frequency converter occurs, is called a forbidden band. It is apparent that the capacity of a frequency converter, for which the presence of the forbidden band is acknowledged and which is designed so as not to operate continuously in the forbidden band, is far smaller than that of a frequency converter for which the presence of the forbidden band is not acknowledged and which is designed so as to be capable of continuous operation in the forbidden band. Therefore, there has been an alternative between two designs. According to one of them, an economical frequency converter having the forbidden band is designed, and continuous drive output regulation in the forbidden band is abandoned. According to the other, no restriction is imposed on the operable region, and an expensive frequency converter having no forbidden band is designed.

Figure 11A:
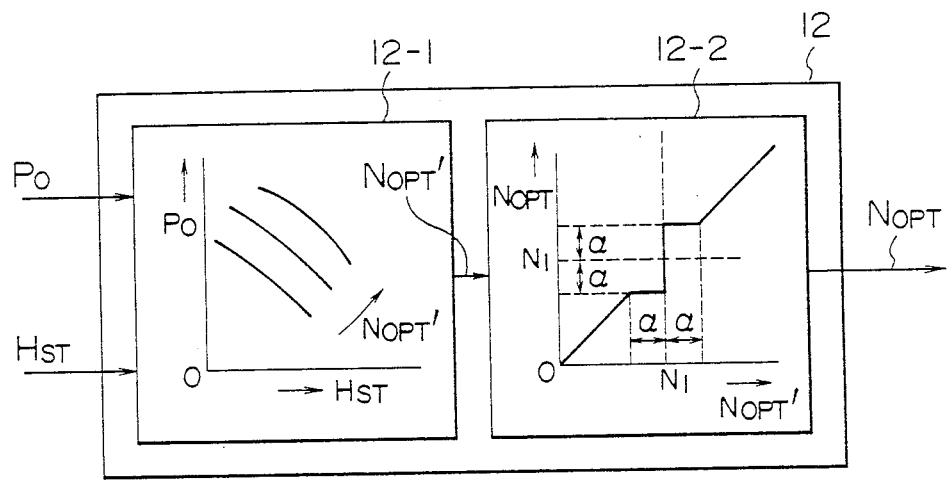
FIGS. 11A and 11B show one form of a function generator suitable for quickly passing over the synchronous speed $N_1$.
Figure 11B:
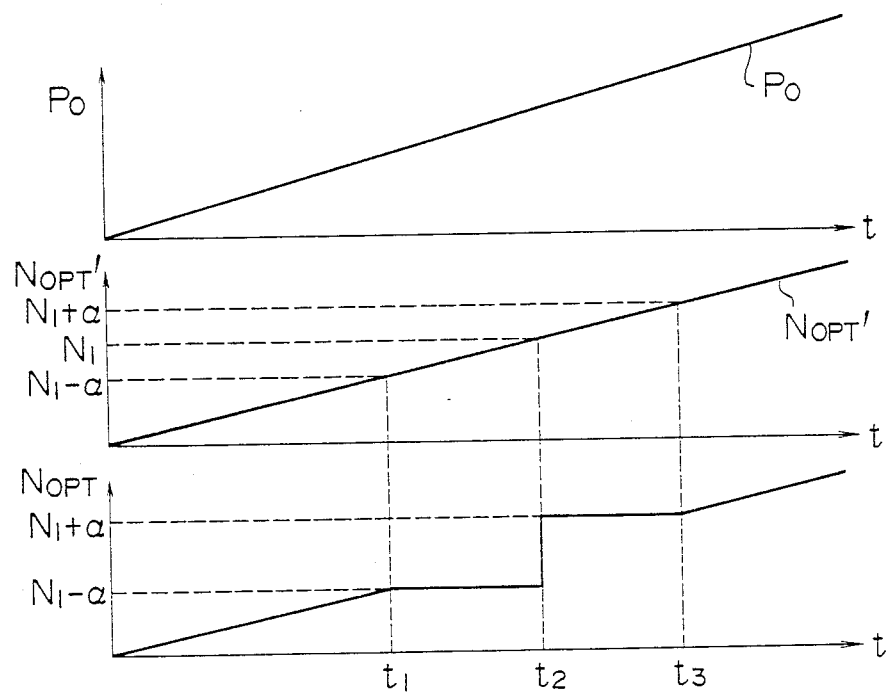

FIG. 11A shows a modification of the frequency converter 12 which deals with the prior art problem. Referring to FIG. 11A, a nonlinear circuit 12-2 is provided besides a primary rotation speed function generator 12-1 determining an optimum rotation speed $N_{OPT}'$, and the optimum rotation speed signal $N_{OPT}'$ is generated from the nonlinear circuit 12-2. The nonlinear characteristic of the nonlinear circuit 12-2 is determined by the synchronous speed $N_1$ of the generator motor 1 and its margin $\alpha$. The margin $\alpha$ is commonly in the order of 0.5 to 1% of $N_1$. When the value of the margin $\alpha$ is as described above, $N_{OPT}=N_{OPT}'$ when $N_{OPT}' \leq N_1-\alpha$ or when $N_{OPT}' \geq N_1+\alpha$; $N_{OPT}=N_1-\alpha$ when $N_1-\alpha < N_{OPT}' < N_1$; and $N_{OPT}=N_1+\alpha$ when $N_1 < N_{OPT}' < N_1+\alpha$. Consequently, when the output command signal $P_o$ increases proportionally as shown in FIG. 11B, and the output $N_{OPT}'$ of the function generator 12-1 increases also in proportion to $P_{oLk}$, the output $N_{OPT}$ of the non-linear circuit 12-2 is limited to $(N_1-\alpha)$ or $(N_1+\alpha)$ when $N_{OPT}'$ is close to the synchronous speed $N_1$, although $N_{OPT}$ increases in proportion to $N_{OPT}'$ up to $(N_1-\alpha)$ or after $(N_1+\alpha)$. Thus, the synchronous speed $N_1$ can be quickly passed and the undesirable temperature rise of the thyristors of the frequency converter can be suppressed to less than an allowable temperature range. Thus, according to this method, a variable-speed pumped-storage power generating system can be realized in which the frequency converter is of an economical design having a forbidden band and operable without any restriction in its operating condition.

It will be understood from the foregoing detailed description that the present invention provides a variable-speed pumped-storage power generating system which can greatly contribute to stable control including AFC control and frequency responsive control of the a.c. electric power system even in a pumping mode.

We claim:

1. A variable-speed pumped-storage power generating system including a generator/motor having a primary winding connected to an electric power system and a secondary winding connected to said electric power system through a frequency converter, and a turbine/pump directly coupled to the shaft of said generator/motor and having guide vanes whose opening is variable, said power generating system comprising a first function generator generating a target rotation speed signal on the basis of at least an output command signal commanding an output power required for said power generating system, a speed regulator generating an output signal based on an error signal between the target rotation speed signal of said first function generator and a rotation speed signal representing an actual rotation speed of said generator/motor, an adder adding the output signal of said speed regulator to said output command signal commanding the output power required for said power generating system thereby generating a composite target output command signal, an output regulator generating an output signal corresponding to an error signal between the composite target output command signal generated by said adder and a power signal representing an actual output power of said generator/motor, the firing angle of said frequency converter being controlled by the output signal of said output regulator, a second function generator generating a target guide-vane opening signal on the basis of at least said output command signal commanding the output power required for said power generating system, and a guide-vane opening regulator generating an output signal corresponding to an error signal between the target guide-vane opening signal of said second function generator and a guide-vane opening signal representing an actual opening of the guide vanes of said turbine/pump thereby controlling the opening of the guide vanes of said turbine/pump.

2. A variable-speed pumped-storage power generating system including a generator/motor having a primary winding connected to an electric power system and a secondary winding connected to said electric power system through a frequency converter, and a turbine/pump directly coupled to the shaft of said generator/motor, said power generating system comprising a first function generator means for generating a target rotation speed signal on the basis of at least an output command signal commanding an output power required for said power generating system, a speed regulator generating an output signal based on an error signal between the target rotation speed signal of said first function generator means and a rotation speed signal representing an actual rotation speed of said generator/motor, an adder adding the output signal of said speed regulator to said output command signal commanding the output power required for said power generating system thereby generating a composite target output command signal, and an output regulator generating an output signal corresponding to an error signal between the composite target output command signal generated by said adder and a power signal representing an actual output power of said generator/motor, the firing angle of said frequency converter being controlled by the output signal of said output regulator, said first function generator means further for setting the rotation speed of said generator/motor at a relatively high speed when said power generating system starts its pumping operation.

3. A variable-speed pumped-storage power generating system including a generator/motor having a primary winding connected to an electric power system and a secondary winding connected to said electric power system through a frequency converter, and a turbine/pump directly coupled to the shaft of said generator/motor, said power generating system comprising a first function generator means for generating a target rotation speed signal on the basis of at least an output command signal commanding an output power required for said power generating system, a speed regulator generating an output signal based on an error signal between the target rotation speed signal of said first function generator and a rotation speed signal representing an actual rotation speed of said generator/motor, an adder adding the output signal of said speed regulator to said output command signal commanding the output power required for said power generating system thereby generating a composite target output command signal, and an output regulator generating an output signal based on an error signal between the composite target output command signal generated by said adder and a power signal representing an actual output power of said generator/motor, the firing angle of said frequency converter being controlled by the output signal of said output regulator, said first function generator means further providing a target rotation speed which changes abruptly in the vicinity of the rated rotation speed of said generator/motor so as to prevent said generator/motor from continuously operating at a speed close to the rated rotation speed.

4. A variable-speed pumped-storage power generating system including a generator/motor having a primary winding connected through a frequency converter to an electric power system and a secondary winding provided with a rotor mounted on a rotary shaft of said generator/motor, and a turbine/pump directly coupled to the shaft of said generator/motor, said power generating system comprising a first function generator generating a target rotation speed signal on the basis of at least an output command signal commanding an output power required for said power generating system, a speed regulator generating an output signal based on an error signal between the target rotation speed signal of said first function generator and a rotation speed signal representing an actual rotation speed of said generator/motor, an adder adding the output signal of said speed regulator to said output command signal commanding the output power required for said power generating system thereby generating a composite target output command signal, an output regulator generating an output signal based on an error signal between the composite target output command signal generated by said adder and a power signal representing an actual output power of said generator/motor, the firing angle of said frequency converter being controlled by the output signal of said output regulator, a second function generator generating a target guide-vane signal on the basis of at least said output command signal commanding the output power required for said power generating system, and a guide-vane opening regulator generating an output signal based on an error signal between the target guide-vane opening signal of said second function generator and a guide-vane opening signal representing an actual opening of the guide vanes of said turbine/pump thereby controlling the opening of the guide vanes of said turbine/pump.

* * * * *